(12) United States Patent
Ikegami

(10) Patent No.: US 10,848,959 B2
(45) Date of Patent: Nov. 24, 2020

(54) WIRELESS COMMUNICATION APPARATUS, METHOD FOR CONTROLLING WIRELESS COMMUNICATION APPARATUS, AND WIRELESS COMMUNICATION SYSTEM

(71) Applicant: KYOCERA CORPORATION, Kyoto (JP)

(72) Inventor: Hiroshi Ikegami, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/172,536

(22) Filed: Oct. 26, 2018

(65) Prior Publication Data

US 2019/0069163 A1    Feb. 28, 2019

Related U.S. Application Data

(63) Continuation of application No. PCT/JP2017/032835, filed on Sep. 12, 2017.

(30) Foreign Application Priority Data

Jan. 25, 2017    (JP) .................... 2017-010945

(51) Int. Cl.
*H04W 4/00* (2018.01)
*H04W 8/18* (2009.01)
(Continued)

(52) U.S. Cl.
CPC ............. *H04W 8/18* (2013.01); *H04M 1/675* (2013.01); *H04M 3/42* (2013.01); *H04W 4/60* (2018.02);
(Continued)

(58) Field of Classification Search
CPC ........... H04W 8/18; H04W 4/60; H04W 3/42; H04W 48/02; H04W 60/06; H04W 4/40
See application file for complete search history.

(56) References Cited

U.S. PATENT DOCUMENTS

2002/0021228 A1*  2/2002  Amita ................. G06Q 20/105
                                                340/928
2002/0195503 A1* 12/2002  Allen, Jr. ............. G07F 7/1008
                                                239/144
(Continued)

FOREIGN PATENT DOCUMENTS

JP    2009-207008 A    9/2009
JP    2012-517771 A    8/2012
(Continued)

*Primary Examiner* — Abdelnabi O Musa
(74) *Attorney, Agent, or Firm* — Studebaker & Brackett PC

(57) ABSTRACT

A wireless communication apparatus mounted on a vehicle, the wireless communication apparatus includes: a wireless communication unit that performs wireless communication with a network; an information card on which information on a contract of a service provided from a communication carrier is recorded; and a control unit that rewrites the information recorded on the information card according to a request for contracting of the service or a request for canceling of the service transmitted from the network when contracting or canceling the service, wherein the control unit writes a cancellation state to the information of the information card according to the request for canceling transmitted from the network.

8 Claims, 3 Drawing Sheets

(51) Int. Cl.
*H04W 40/24* (2009.01)
*H04W 60/06* (2009.01)
*H04W 4/60* (2018.01)
*H04W 48/02* (2009.01)
*H04M 3/42* (2006.01)
*H04M 1/675* (2006.01)
*H04W 4/40* (2018.01)
*H04W 76/30* (2018.01)

(52) U.S. Cl.
CPC ......... *H04W 40/248* (2013.01); *H04W 48/02* (2013.01); *H04W 60/06* (2013.01); *H04W 4/40* (2018.02); *H04W 76/30* (2018.02)

(56) References Cited

U.S. PATENT DOCUMENTS

| | | | |
|---|---|---|---|
| 2007/0287415 A1* | 12/2007 | Yamada | G06Q 10/10 455/406 |
| 2008/0010560 A1* | 1/2008 | Morimoto | G06Q 50/10 714/47.1 |
| 2009/0305672 A1* | 12/2009 | Bennett | H04W 48/18 455/411 |
| 2011/0093160 A1* | 4/2011 | Ramseyer | G07C 5/008 701/31.4 |
| 2015/0056949 A1* | 2/2015 | Matsumura | H04M 3/38 455/406 |
| 2015/0278760 A1* | 10/2015 | Greven | G06Q 10/10 705/30 |
| 2015/0358798 A1* | 12/2015 | Okawa | H04W 8/18 455/404.2 |

FOREIGN PATENT DOCUMENTS

| | | |
|---|---|---|
| JP | 2013-077937 A | 4/2013 |
| JP | 2015-177279 A | 10/2015 |
| JP | 2016-111409 A | 6/2016 |
| WO | 2013/146055 A1 | 10/2013 |

* cited by examiner

WIRELESS COMMUNICATION APPARATUS, METHOD FOR CONTROLLING WIRELESS COMMUNICATION APPARATUS, AND WIRELESS COMMUNICATION SYSTEM

CROSS-REFERENCE TO RELATED APPLICATION

This application claims priority from International Patent Application No. PCT/JP2017/032835 filed on Sep. 12, 2017, the entire subject matter of which is incorporated herein by reference.

TECHNICAL FIELD

The present disclosure relates to a wireless communication apparatus using an information card such as a SIM card, a method of controlling the wireless communication apparatus, and a wireless communication system.

BACKGROUND ART

In a wireless communication apparatus conforming to the 3rd Generation Partnership Project (3GPP), a Subscriber Identity Module (SIM) card or a User Identity Module (UIM) card (hereinafter, the SIM card and the UIM card are simply referred to as a SIM card) provided from a communication business operation (also referred to as an operator or a communication carrier) is attached to the wireless communication apparatus and used.

The SIM card is an IC card that stores contractor (user) information of the wireless communication apparatus, a contracted service, and the like. The user can use the contracted service by using the wireless communication apparatus to which the SIM card is attached (for example, refer to 2016-111409).

SUMMARY

The present disclosure provides a wireless communication apparatus, a method of controlling the wireless communication apparatus, and a wireless communication system capable of appropriately processing wireless communication of the wireless communication apparatus when performing contracting or cancelling of a service by a user using the wireless communication apparatus.

A wireless communication apparatus of the present disclosure includes a wireless communication unit that performs wireless communication with a network, an information card on which information on a contract of a service provided from a communication carrier is recorded, and a control unit that rewrites the information recorded on the information card according to a request for contracting of the service or a request for canceling of the service transmitted from the network when contracting or canceling the service.

In the wireless communication apparatus of the present disclosure, when a request for transmission using the network provided by the communication carrier is received, the control unit may acquire the information on the contract of the service from the information card, and in a case where the information is in a cancellation state, the control unit may reject the transmission.

In the wireless communication apparatus of the present disclosure, even in a case where the information is in the cancellation state, in a case of the transmission in an emergency situation, the control unit may perform the transmission.

In the wireless communication apparatus of the present disclosure, in a case where the information is in the cancellation state, the control unit may restrict communication of the network.

In the wireless communication apparatus of the present disclosure, the control unit may receive information or the request for contracting transmitted from the network.

In the wireless communication apparatus of the present disclosure, the control unit may receive information or a request for a contracting transmitted from a network different from the network.

In the wireless communication apparatus of the present disclosure, even in a case where the information is in the cancellation state, in a case of transmission when an abnormality of the vehicle is detected, the control unit may perform the transmission.

The vehicle of the present disclosure may be equipped with the wireless communication apparatus described above.

A method of controlling a wireless communication apparatus of the present disclosure is a method of controlling a wireless communication apparatus including a wireless communication unit that performs wireless communication with a network, and an information card on which information on a contract of a service provided from a communication carrier is recorded, and mounted on a vehicle, the method including a step of rewriting the information recorded on the information card according to a request for canceling of the service transmitted from the network when canceling the service.

A wireless communication system of the present disclosure includes a wireless communication apparatus mounted on a vehicle, and a network provided by a communication carrier. The wireless communication apparatus includes a wireless communication unit that performs wireless communication with the network, an information card on which information on a contract of a service provided from the communication carrier is recorded, and a control unit that rewrites the information recorded on the information card according to a request for contracting of the service or a request for canceling of the service transmitted from the network when contracting or canceling the service. The control unit writes a cancellation state to the information of the information card according to the request for canceling transmitted from the network.

The present disclosure provides a wireless communication apparatus and a method of controlling the wireless communication apparatus capable of appropriately processing wireless communication of the wireless communication apparatus when performing contracting or cancelling of a service by a user using the wireless communication apparatus.

BRIEF DESCRIPTION OF THE DRAWINGS

The foregoing and additional features and characteristics of this disclosure will become more apparent from the following detailed descriptions considered with the reference to the accompanying drawings, wherein.

DESCRIPTION OF EMBODIMENTS

Hereinafter, the present embodiment will be described with reference to the drawings.

Figure 1:
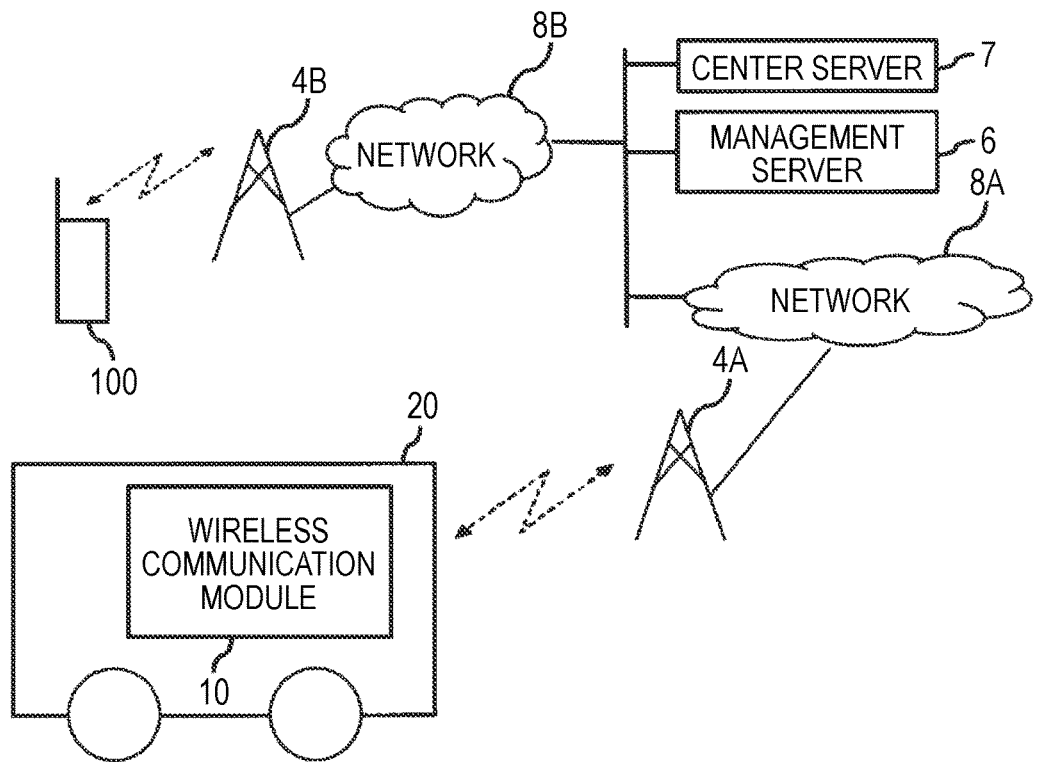
FIG. 1 is a configuration diagram illustrating a wireless communication system according to an embodiment.

FIG. 1 is a configuration diagram illustrating a wireless communication system according to the present embodiment. The wireless communication system shown in FIG. 1 includes a vehicle 20 on which the a wireless communication module 10 is mounted, a base station 4A, a base station 4B, a network 8A, a network 8B, a wireless terminal 100, a management server 6, and a center server 7.

The base station 4A, the base station 4B, the network 8A, and the network 8B are provided by a communication carrier A. Hereinafter, when describing a base station 4 or a network 8 without discrimination, the base station 4 or the network 8 is simply described as the base station 4 or the network 8, and when describing the base station 4 or the network 8 separately, the base station 4 or the network 8 is described as the base stations 4A and 4B or the networks 8A or 8B.

The base station 4 may correspond to any mobile communication system including a second generation mobile communication system such as Global System for Mobile communications (GSM) (registered trademark), a third generation mobile communication system such as Code Division Multiple Access (CDMA), or a fourth generation mobile communication system such as Long Term Evolution (LTE).

The wireless communication module 10 realizes various functions. For example, a telematics service that provides an information service in real time by combining the vehicle 20 and a communication system is known. In the telematics service, map data or Point Of Interest (POI) data for updating data of a navigation system is downloaded from the center server 7. In the telematics service, diagnosis information of an onboard device is uploaded to the center server 7. The wireless communication module 10 performs such download and upload through the network 8.

The wireless communication module 10 is mounted on a vehicle such as the vehicle 20. In the present embodiment, as an example of the vehicle, the vehicle 20 is described. Of course, the vehicle may be any vehicle as long as the vehicle moves, such as a ship, a train, or a portable terminal such as a mobile phone or a smartphone.

The wireless communication module 10 may correspond to a second generation mobile communication system, a third generation mobile communication system, or a fourth generation mobile communication system. The wireless communication module 10 is also able to communicate with the wireless terminal 100. The wireless communication module 10 may also have various functions and a function for executing a program created by the user.

A communication carrier A operating the base station 4 or the network 8 provides a mobile communication service of the communication carrier A to a user who has contracted with the communication carrier A.

Figure 2:
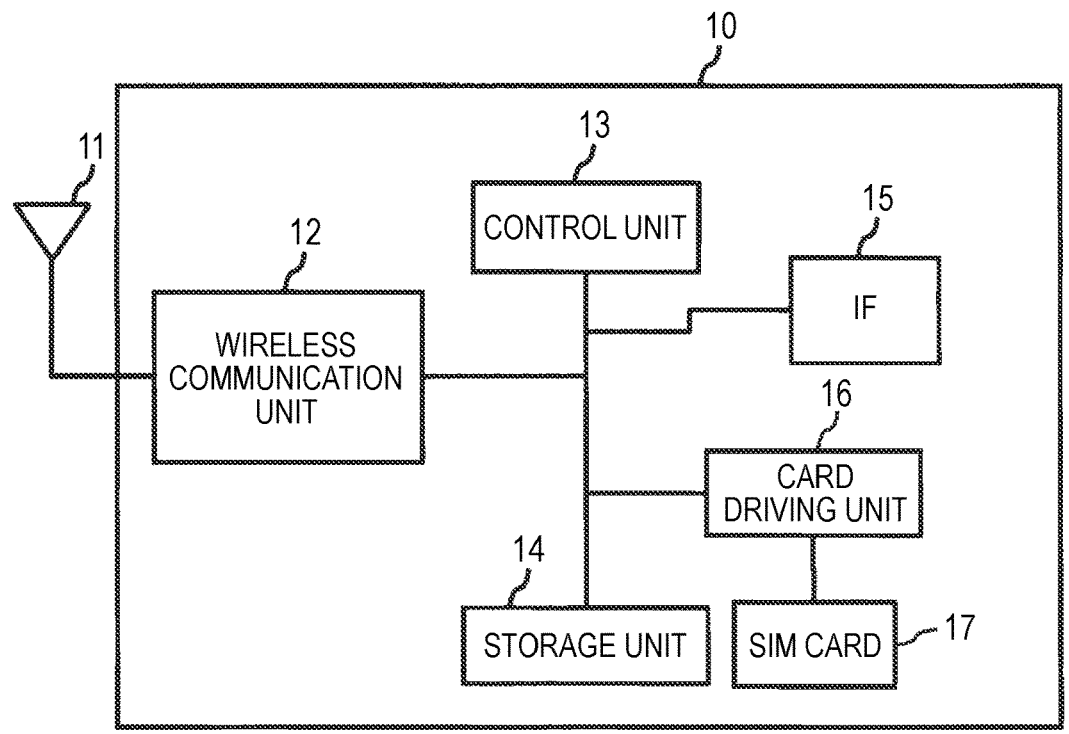
FIG. 2 is a block diagram illustrating a wireless communication module according to the embodiment.

FIG. 2 is a block diagram illustrating the wireless communication module according to the present embodiment. The wireless communication module shown in FIG. 2 includes an antenna 11, a wireless communication unit 12, a control unit 13, a storage unit 14, a card driving unit 16, and a SIM card 17.

The antenna 11 transmits and receives a wireless signal to and from the base station 4.

The wireless communication unit 12 is for wirelessly communicating with the base station 4 through the antenna 11. The wireless communication unit 12 includes an analog signal processing unit or a digital signal processing unit.

In the analog signal processing unit, amplification, analog-digital conversion processing, and the like of the wireless signal received from the antenna 11 are performed, an analog amplification is performed on digital-analog conversion processing and the like of a digital signal transferred from the digital signal processing unit, and the amplified analog signal is transmitted through the antenna 11.

In the digital signal processing unit, data transferred from the control unit 13 is encoded, the encoded data is converted into a digital signal so that the encoded data is able to be transmitted by a communication channel of the wireless signal, the digital signal transferred from the analog signal processing unit is decoded, and the decoded data is transferred to the control unit 13.

The control unit 13 is configured of a microcomputer including a Central Processing Unit (CPU) that executes various programs, a Read Only Memory (ROM), a Random Access Memory (RAM), a backup RAM, an Input/Output (I/O), and the like (all not shown) as a main body, and executes various kinds of processing by executing various control programs stored in the ROM. The control unit 13 executes processing necessary for controlling the wireless communication unit 12.

The storage unit 14 is configured by an Electronically Erasable and Programmable Read Only Memory (EE-PROM) or the like that is able to electrically rewire a content, and stores a program and information necessary for controlling the wireless communication unit 12.

The interface (IF) 15 is an IF of a USB, other IFs, or the like, and is connected to a display, a microphone and a speaker, a navigation system, or the like.

The card driving unit 16 is configured to drive an IC card referred to as the SIM card (or the UIM card), that is, the information card. The card driving unit 16 may be configured to be able to extract and acquire the SIM card 17. The card driving unit 16 is configured to read setting information recorded in the SIM card 17 and write the setting information in the SIM card 17 in a case where the card driving unit 16 receives reading or writing of the setting information from the control unit 13.

In general, the SIM card is an IC card in which information for specifying a subscriber, carrier specification information for specifying the communication carrier, information on an available service contracted by the subscriber, and the like are recorded.

The SIM card 17 may be an embedded type eSIM (embedded SIM). The SIM card 17 may be provided from the communication carrier or may be obtained by other means. The user is able to use the wireless communication module 10 by attaching the provided SIM card 17 in the wireless communication module 10.

In the SIM card, the setting information necessary for receiving the service is recorded. For example, there are various pieces of the setting information such as information when registering position information, and information on a telephone number. Such pieces of the information are transmitted to a server on the network 8.

Hereinafter, an operation of the wireless communication system according to the present embodiment will be described.

For example, in a case where a contract of the user of the wireless communication module 10 is canceled, the communication carrier performs a notification for requesting for a release of a connection with the network 8 from the management server 6 to the wireless communication module 10 through the network 8. At this time, in the notified information, a reason value for canceling the contract is included. Since the reason value depends on the communication carrier and the reason values are not the same in all communication carriers, in a case where the reason value of the notification is not appropriate, there is a concern that the wireless communication module 10 may perform transmission without considering the cancellation of the contract in spite of the cancellation of the contract. Therefore, in the present embodiment, an operation of canceling the contract of the user of the wireless communication module 10 without using the reason value is described.

Figure 3:
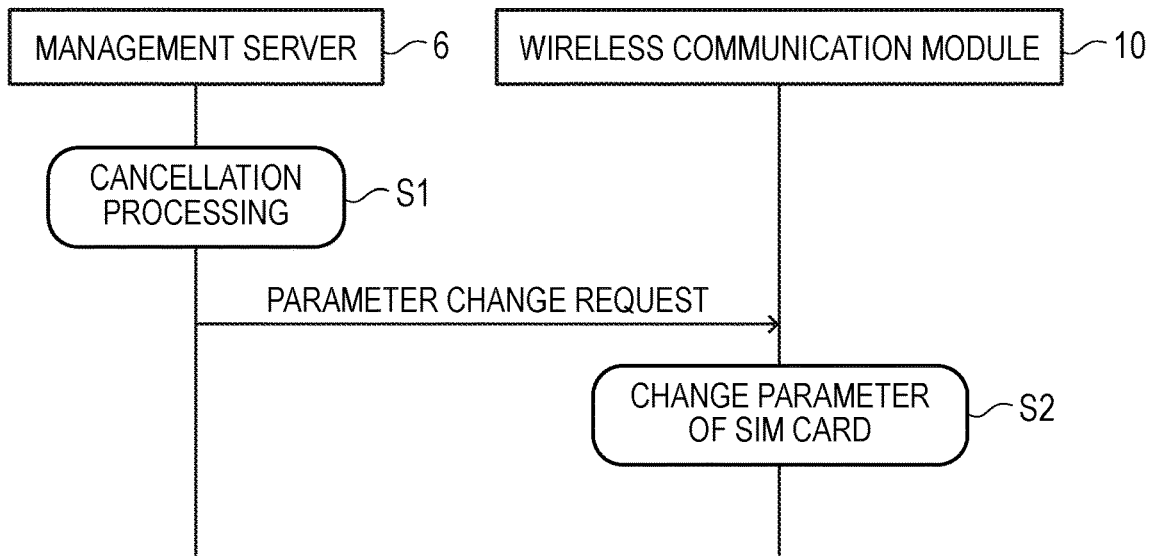
FIG. 3 is a sequence diagram illustrating an operation of the wireless communication system according to the embodiment.

FIG. 3 is a sequence diagram illustrating the operation of the wireless communication system according to the present embodiment.

First, in a case where the user of the wireless communication module 10 cancels the service of the communication carrier A, the management server 6 performs cancellation processing of the service (step S1). At this time, the management server 6 transmits a parameter change request for performing the cancellation to the wireless communication module 10. For example, the parameter change request may be a message that is able to be replaced with a message stipulated by 3GPP.

Next, in a case where the wireless communication module 10 receives the parameter change request, the control unit 13 writes the cancellation state in the information (parameter) present in the SIM card 17 through the card driving unit 16 (step S2). In detail, the SIM card 17 includes information (parameter) for determining the contract or the cancellation, and the control unit 13 sets that the information is canceled.

As an example of the information (parameter) present in the SIM card 17, there is Voice Group Call Service Status (EFVGCSS) stipulated in TS31.102 that is a specification of 3GPP. The contract/cancellation is determined using coding of "Activation/Deactivation Flags" of the EFVGCSS. For example, the contract state or the cancellation state is determined according to whether a bit of the coding is 0 or 1.

As another example, the contract state may be set by setting "FDN service" stipulated in TS31.102 to be disabled and the cancellation state may be set by setting the "FDN service" to be enabled. As another example, the contract state or the cancellation state may be determined by using information of "Services n° (8X-7) to n° (8X)" of EFUST (USIM Service Table) stipulated in TS31.102.

Although the user of the wireless communication module 10 cancels the service of the communication carrier A, a communication function of the wireless communication module 10 to which the SIM card 17 is attached is not stopped. Even in a state in which the service of the communication carrier A is canceled, communication with the network 8 and the management server 6 may be possible. Communication may be restricted such as communication with a special server (for example, the center server 7) not the management server 6.

Even in a case of the cancellation state including a case where the service of the communication carrier A is not contracted and a case where the service has never been contracted, the communication may be restricted such as the communication with the special server not the management server 6. For example, the wireless communication module 10 is able to receive information or a request of the contract from the network 8 so that the contract is able to be contracted. For example, the wireless communication module 10 is able to receive the information or the request of the contract from a network different from the network 8 of the communication carrier A so that the contract is able to be contracted. In a case where there are a network of a communication carrier B and a base station connected to the network, the wireless communication module 10 is able to receive the information or the request of the contract through the base station and the network of the communication carrier B. Although the vehicle moves 20 outside a communication range of the communication carrier A, it is possible to improve convenience of contract processing by receiving the information or the request of the contract from the network different from the network 8 of the communication carrier A.

Figure 4:
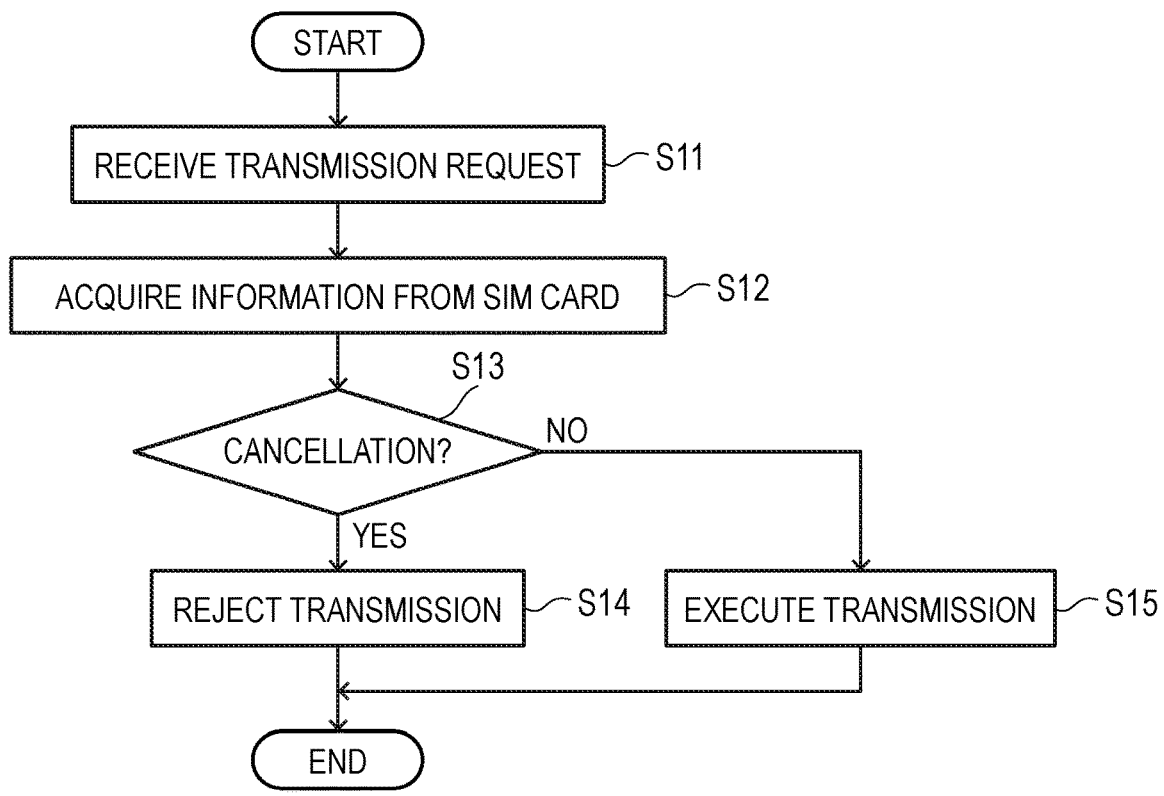
FIG. 4 is a flowchart illustrating an operation of the wireless communication module according to the embodiment.

The operation of the wireless communication module according to the present embodiment will be described. FIG. 4 is a flowchart illustrating the operation of the wireless communication module according to the present embodiment.

First, the wireless communication module 10 receives a request of transmission using the network 8 provided by the communication carrier A (step S11). The transmission includes a phone call, data communication, and the like. For example, a case where the wireless communication module 10 performs the transmission is a case where a user calls some, a case where the user performs the data communication by a telematics service or the like, or the like.

Next, the control unit 13 acquires the information (parameter) for determining whether the user is contracting or canceling the service from the SIM card 17 (step S12). The control unit 13 determines whether or not the user is canceled the service of the communication carrier A from the information (step S13).

In a case of the cancellation, the control unit 13 rejects the transmission (step S14). Here, a case of the cancellation includes a case where the service is not contracted and also includes a case where the service has never been contracted. In a case where a state is not the cancelation (in a case of the contract), the control unit 13 executes the transmission (step S15).

In step S14, the control unit 13 rejects the transmission in a case of the cancellation. However, in a case where the transmission is in a special situation, the control unit 13 may perform the transmission. For example, the special situation is a case where an emergency situation such as a traffic accident occurs and the user notifies a center of the emergency situation, or a case where the wireless communication module 10 notifies the center (for example, the center server 7) of an abnormality or the like of the vehicle 20 when the abnormality or the like of the vehicle 20 equipped with the wireless communication module 10 is detected due to a traffic accident or the like. In such a case, the control unit 13 may perform the transmission without rejecting the transmission.

As described above, in the wireless communication system according to the present embodiment, although the transmission is able to be performed even in the cancellation state of the contract of the user in a case where a reason value is notified, it is possible to reliably suppress the transmission and it is not necessary to perform a wasteful transmission in comparison with an example in which the reason value for requesting a release from the connection with the network 8 is notified when the service is canceled.

A case where the user of the wireless communication module 10 contracts the service of the communication carrier A in the wireless communication system according to the present embodiment will be described. Here, a state in which the user of the wireless communication module 10 has not contracted the service of the communication carrier A and the SIM card 17 is attached to the wireless communication module 10, or a case where the user contracts the service in a state in which the SIM card 17 is incorporated in the wireless communication module 10 in advance will be described.

Figure 5:
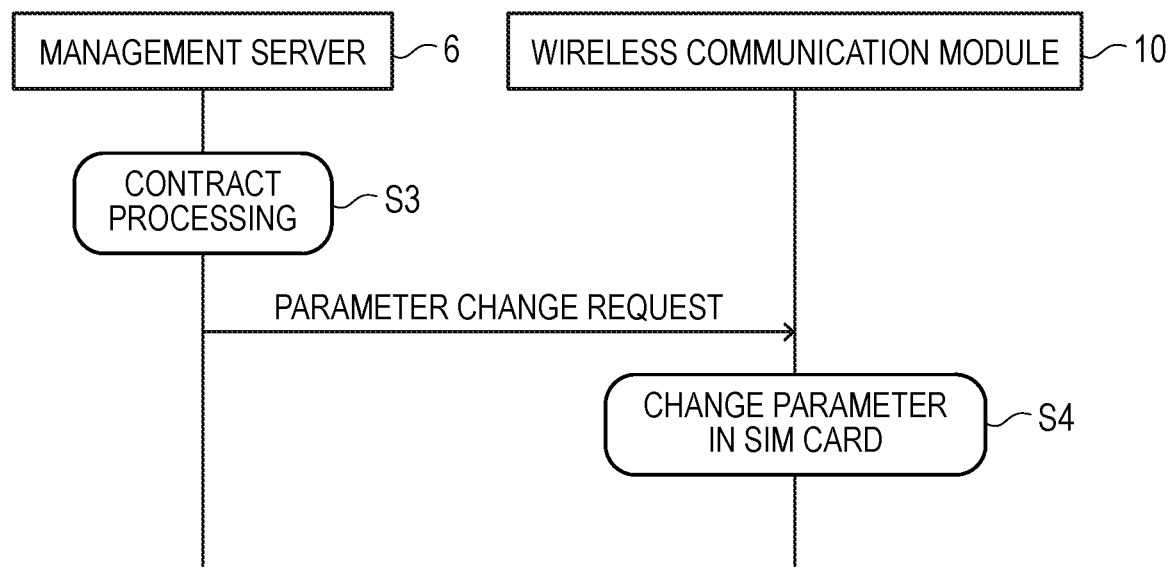
FIG. 5 is a sequence diagram illustrating the operation of the wireless communication system according to the embodiment in a case where a service is contracted.

FIG. 5 is a sequence diagram illustrating the operation of the wireless communication system according to the present embodiment in a case where the service is contracted.

First, in a case where the user of the wireless communication module 10 contracts the service of the communication carrier A, the management server 6 performs the contract processing of the user of the wireless communication module 10 (step S3). At this time, the management server 6 transmits the parameter change request for performing the contract of the user to the wireless communication module 10. For example, the parameter change request may be a message that is able to be replaced with a message stipulated by 3GPP.

Next, in a case where the wireless communication module 10 receives the parameter change request, the control unit 13 writes the contract state in the information present in the SIM card 17 through the card driving unit 16 (step S4). In detail, the SIM card 17 includes information (parameter) for determining the contract or the cancellation, and the control unit 13 sets that the information is contracted.

In the contract state, in a case where the wireless communication module 10 receives the request of the transmission, as described with reference to FIG. 4, in step S15, the control unit 13 executes the transmission.

As described above, since the wireless communication module 10 is able to contract the service of the communication carrier A in a case where the SIM card 17 is attached to the wireless communication module 10 or the SIM card 17 is incorporated in the wireless communication module 10 in advance, convenience increases.

As described above, in the wireless communication system according to the present embodiment, although the wireless communication module 10 is not able to perform the transmission in the cancellation state of the service, the wireless communication module 10 is able to communicate with the network 8 and the management server 6. Therefore, it is possible to set the wireless communication module 10 to the contract state from the management server 6.

This application is based upon and claims the benefit of priority from Japanese Patent Application No. 2017-010945, filed Jan. 25, 2017, the entire contents of which are incorporated herein by reference.

INDUSTRIAL APPLICABILITY

The present disclosure can provide a wireless communication apparatus, a method of controlling the wireless communication apparatus, and a wireless communication system capable of appropriately processing wireless communication of the wireless communication apparatus when performing contracting or cancelling of a service by a user using the wireless communication apparatus.

REFERENCE SIGNS LIST 4 base station
8 network
6 management server
7 center server
10 wireless communication module
11 antenna
12 wireless communication unit
13 control unit
14 storage unit
15 IF
16 card driving unit
17 SIM card
20 vehicle
100 wireless terminal

What is claimed is:

1. A wireless communication apparatus mounted on a vehicle, the wireless communication apparatus comprising:
an information card on which information on a contract of a service provided from a communication carrier is recorded; and
a processor and a memory coupled to the processor, the processor configured to:
drive the information card,
perform communication with a network, and
rewrite the information recorded on the information card according to a request for contracting of the service or a request for canceling of the service transmitted from the network when contracting or canceling the service, wherein
the processor is configured to write a cancellation state to the information of the information card according to the request for canceling transmitted from the network,
when a request of a transmission originated from the wireless communication apparatus that uses the network provided by the communication carrier is received from a user of the wireless communication apparatus, the processor is configured to acquire information on the contract of the service from the information card, and
in a case where the information on the contract is in a cancellation state, the processor is configured to reject the transmission.

2. The wireless communication apparatus according to claim 1, wherein
even in a case where the information is in the cancellation state, in a case of transmission in an emergency situation, the processor performs the transmission.

3. The wireless communication apparatus according to claim 1, wherein
in a case where the information is in the cancellation state and while communication of the network is restricted, the processor receives information or the request for contracting transmitted from the network.

4. The wireless communication apparatus according to claim 1, wherein
in a case where the information is in the cancellation state and while communication of the network is restricted, the processor receives information or a request for a contracting transmitted from a network different from the network.

5. The wireless communication apparatus according to claim 1, wherein
even in a case where the information is in the cancellation state, in a case of transmission when a malfunction of the vehicle is detected, the processor performs the transmission.

6. A vehicle equipped with the wireless communication apparatus according to claim 1.

7. A method of controlling a wireless communication apparatus including an information card on which information on a contract of a service provided from a communication carrier is recorded and a processor and a memory coupled to the processor, and mounted on a vehicle, the method comprising:
   driving the information card;
   performing communication with a network;
   rewriting the information recorded on the information card according to a request for canceling of the service transmitted from the network when canceling the service; and
   writing a cancellation state to the information of the information card according to the request for canceling transmitted from the network, wherein
   when a request of a transmission originated from the wireless communication apparatus that uses the network provided by the communication carrier is received from a user of the wireless communication apparatus, the processor is configured to acquire information on the contract of the service from the information card, and
   in a case where the information on the contract is in a cancellation state, the processor is configured to reject the transmission.

8. A wireless communication system including:
   a wireless communication apparatus mounted on a vehicle; and
   a network provided by a communication carrier,
   the wireless communication apparatus including
      an information card on which information on a contract of a service provided from the communication carrier is recorded, and
      a processor and a memory coupled to the processor, the processor configured to:
         drive the information card,
         perform communication with a network,
         rewrite the information recorded on the information card according to a request for contracting of the service or a request for canceling of the service transmitted from the network when contracting or canceling the service, and
         write a cancellation state to the information of the information card according to the request for canceling transmitted from the network, wherein
   when a request of a transmission originated from the wireless communication apparatus that uses the network provided by the communication carrier is received from a user of the wireless communication apparatus, the processor is configured to acquire information on the contract of the service from the information card, and
   in a case where the information on the contract is in a cancellation state, the processor is configured to reject the transmission.

* * * * *